United States Patent
Ryu et al.

(10) Patent No.: US 12,146,055 B2
(45) Date of Patent: Nov. 19, 2024

(54) THERMOPLASTIC MOLDING COMPOSITION AND AUTOMOBILE COMPONENT INCLUDING MOLDED ARTICLE THEREOF

(71) Applicant: LG CHEM, LTD., Seoul (KR)

(72) Inventors: Kwang Su Ryu, Daejeon (KR); Sang Wook Na, Daejeon (KR); Sun Mo Son, Daejeon (KR); Min Han Kwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 698 days.

(21) Appl. No.: 17/425,647

(22) PCT Filed: Dec. 4, 2020

(86) PCT No.: PCT/KR2020/017605
§ 371 (c)(1),
(2) Date: Jul. 23, 2021

(87) PCT Pub. No.: WO2021/112609
PCT Pub. Date: Jun. 10, 2021

(65) Prior Publication Data
US 2022/0098408 A1    Mar. 31, 2022

(30) Foreign Application Priority Data

Dec. 6, 2019  (KR) .......... 10-2019-0161151
Dec. 4, 2020  (KR) .......... 10-2020-0167993

(51) Int. Cl.
*C08L 77/06*    (2006.01)
(52) U.S. Cl.
CPC ................. *C08L 77/06* (2013.01)
(58) Field of Classification Search
None
See application file for complete search history.

(56) References Cited

U.S. PATENT DOCUMENTS

| | | | |
|---|---|---|---|
| 2005/0136237 A1* | 6/2005 | Beerda ........... | C08G 18/62 428/297.4 |
| 2017/0058104 A1* | 3/2017 | Kim ............... | C08J 3/203 |
| 2017/0342266 A1 | 11/2017 | Jung et al. | |

FOREIGN PATENT DOCUMENTS

| | | |
|---|---|---|
| CN | 101200590 A | 6/2008 |
| CN | 102516761 A | 6/2012 |
| CN | 104672895 A | 6/2015 |
| CN | 105579528 A | 5/2016 |
| CN | 107325549 A | 11/2017 |
| CN | 109943067 A | 6/2019 |
| CN | 107298855 B | 10/2019 |
| JP | 2005-513186 A | 5/2005 |
| JP | 2006-291118 A | 10/2006 |
| JP | 2007-277391 A | 10/2007 |
| JP | 2010-501653 A | 1/2010 |
| JP | 2015-105378 A | 6/2015 |
| JP | 2015-196834 A | 11/2015 |
| JP | 2016-047936 A | 4/2016 |
| JP | 2016-117817 A | 6/2016 |
| JP | 2016-525602 A | 8/2016 |
| JP | 2017-155150 A | 9/2017 |
| JP | 2017-537207 A | 12/2017 |
| JP | 2017-538821 A | 12/2017 |
| KR | 10-2009-0040393 A | 4/2009 |
| KR | 10-2014-0054365 A | 5/2014 |
| KR | 10-2014-0123341 A | 10/2014 |
| KR | 10-2015-0139447 A | 12/2015 |
| KR | 10-2017-0094323 A | 8/2017 |
| WO | 9708222 A1 | 3/1997 |

OTHER PUBLICATIONS

Datasheet for Invista U4800 NC01 (Year: 2024).*
J. Heyn, et al., "Interaction between coolant, polyamide 6.6, glass fibers and additives", AIP Conference Proceedings 2055, 020006, Jan. 22, 2019, XP055895089, pages pp. 20006-1-20006-5.

* cited by examiner

*Primary Examiner* — Robert T Butcher
(74) *Attorney, Agent, or Firm* — Bryan Cave Leighton Paisner LLP

(57) ABSTRACT

The present disclosure provides a thermoplastic molding composition having excellent chemical resistance and an automobile component including a molded article thereof.

14 Claims, No Drawings

THERMOPLASTIC MOLDING COMPOSITION AND AUTOMOBILE COMPONENT INCLUDING MOLDED ARTICLE THEREOF

CROSS-REFERENCE TO RELATED APPLICATIONS

This application is a National Phase entry pursuant to 35 U.S.C. § 371 of International Application No. PCT/KR2020/017605, filed on Dec. 4, 2020, and claims priority to and the benefit of Korean Patent Application No. 10-2019-0161151, filed on Dec. 6, 2019, and Korean Patent Application No. 10-2020-0167993, filed on Dec. 4, 2020, with the Korean Intellectual Property Office, the disclosures of which are incorporated by reference in their entirety for all purposes as if fully set forth herein.

TECHNICAL FIELD

The present invention relates to a thermoplastic molding composition and an automobile component including a molded article thereof, and more particularly, to a thermoplastic molding composition having excellent chemical resistance and an automobile component including a molded article thereof.

BACKGROUND ART

Polyamide 66 is a crystalline plastic, which has excellent mechanical properties, heat resistance, abrasion resistance, and processability. Recently, to improve fuel efficiency of automobiles and to manufacture high-performance engines, polyamide 66 has been widely used for automobile components.

However, polyamide 66 has an amide bond structure, and an amide bond is hydrolyzable. Accordingly, polyamide 66 has a disadvantage of being vulnerable to moisture. In particular, the physical properties of polyamide 66 are noticeably deteriorated under high temperature and high humidity conditions.

Accordingly, to increase the utilization of polyamide 66, the hydrolysis resistance of polyamide 66 must be improved.

To suppress hydrolysis of polyamide 66, several attempts, such as increasing the viscosity of polyamide 66 and changing the type of glass fiber, have been made. However, as a result of those attempts, the fluidity of polyamide 66 was reduced, which deteriorated the appearance of a final product.

That is, there is a need for a composition capable of preventing deterioration of physical properties due to hydrolysis and deterioration of appearance due to lifting of glass fiber and gas generation even when left in a high temperature and humidity environment for a long period of time.

DISCLOSURE

Technical Problem

Therefore, the present invention has been made in view of the above problems, and it is one object of the present invention to provide a thermoplastic molding composition with improved chemical resistance and moldability and an automobile component including a molded article thereof.

However, the technical problem to be solved by the present invention is not limited to the above-mentioned problem, and other problems not mentioned herein can be clearly understood by those skilled in the art from the following description.

Technical Solution

In accordance with one aspect of the present invention, provided is a thermoplastic molding composition comprising polyamide 66; glass fiber; and a stabilizer, wherein the polyamide 66 contains an amine end group of 85 meqiv/kg or more.

In addition, according to another aspect of the present invention, a thermoplastic molding composition comprising polyamide 66; glass fiber; and a stabilizer and having an impact strength of 35 kJ/m$^2$ or more can be provided. In this case, when the impact strength is measured, a solution containing 50% by weight of a glycol and 50% by weight of water, and a specimen are placed in an autoclave and left at 130° C. for 1,000 hours, the specimen is taken out of the autoclave, and then unnotched flat and unnotched edge Charpy impact strength are measured according to ISO 179.

In addition, according to another aspect of the present invention, a thermoplastic molding composition comprising polyamide 66; glass fiber; and a stabilizer and having an elongation of 1.8% or more can be provided. In this case, when the elongation is measured, a solution containing 50% by weight of a glycol and 50% by weight of water, and a specimen are placed in an autoclave and left at 130° C. for 1,000 hours, the specimen is taken out of the autoclave, and then elongation is measured by rupturing the specimen at a crosshead speed of 5 mm/min using a tension tester according to ISO 527.

In addition, according to another aspect of the present invention, a thermoplastic molding composition comprising polyamide 66; glass fiber; and a stabilizer can be provided, wherein the polyamide 66 has a relative viscosity of 2.0 to 3.2 and be comprised in an amount of 50 to 75% by weight.

In accordance with another aspect of the present invention, provided is an automobile component comprising a molded article manufactured using the thermoplastic molding composition.

Advantageous Effects

A thermoplastic molding composition according to one embodiment of the present invention can maintain excellent physical properties, such as tensile strength, elongation, and impact strength, even when left in a high temperature and high humidity environment for a long period of time.

The effects of the present invention are not limited to the above-described effects, and effects not mentioned herein will be clearly understood by those skilled in the art from the present specification and the accompanying drawings.

DETAILED DESCRIPTION

In the present invention, it is to be understood that, unless stated otherwise, when a part "comprises" any element, the part may include other elements without excluding other elements.

Hereinafter, the present invention will be described in more detail.

A thermoplastic molding composition according to one embodiment of the present invention includes polyamide 66; glass fiber; and a stabilizer. In this case, the polyamide 66 contains an amine end group of 85 meqiv/kg or more.

When the polyamide 66 contains an amine end group of 85 meqiv/kg or more, the hydrolysis resistance of the polyamide 66 can be excellent, thereby improving the physical properties of a thermoplastic molding composition, such as chemical resistance and moldability.

The polyamide 66 preferably contains an amine end group of 85 to 102 meqiv/kg, more preferably of 85 to 95 meqiv/kg. Within this range, the hydrolysis resistance of the polyamide 66 can be excellent, thereby improving the physical properties of a thermoplastic molding composition, such as chemical resistance and moldability.

"Amine end group" or "amine end group of 85 meqiv/kg or more" may refer to a concentration of an amine end group contained in a polyamide resin, and the concentration of an amine end group may be measured according to a method disclosed in published literature "Nylon Plastics Handbook by Melvin. I. Kohan (Hanser, 1995, 79-80 p)".

According to one embodiment of the present invention, the polyamide 66 can be included in an amount of 50 to 75% by weight, preferably 65 to 70% by weight in the thermoplastic molding composition. When the polyamide 66 is included within this content range, the hydrolysis resistance of the thermoplastic molding composition can be improved.

According to one embodiment of the present invention, the polyamide 66 can have a relative viscosity of 2.0 to 3.2, preferably 2.3 to 2.7. When the polyamide 66 has a viscosity value within this range, appropriate moldability and long-term chemical resistance can be achieved.

In the present description, relative viscosity can be measured using an Ubbelohde viscometer by a sulfuric acid method according to ISO 307. Specifically, relative viscosity can be measured at 25° C. using an Ubbelohde viscometer and a solution prepared by dissolving 1 g of a specimen in 100 ml of an aqueous sulfuric acid solution having a concentration of 96% by weight.

According to one embodiment of the present invention, the glass fiber can be included in an amount of 20 to 50% by weight, preferably 30 to 40% by weight, more preferably 30 to 35% by weight in the thermoplastic molding composition. When the glass fiber is included within this content range, rigidity and long-term physical properties can be improved.

According to one embodiment of the present invention, the surface of the glass fiber can be treated with a hydrolysis-resistant coating. Specifically, when the surface of the glass fiber is coated with an amino silane, hydrolysis resistance can be excellent.

According to one embodiment of the present invention, the amino silane can include one or more selected from the group consisting of N-(2-aminoethyl)-3-aminopropyltriethoxysilane, gamma-aminopropyltriethoxysilane, N-phenyl-gamma-aminopropyltrimethoxysilane, N-(2-aminoethyl)-3-aminopropylmethyldimethoxysilane, N-(2-aminoethyl)-3-aminopropyltrimethoxysilane, and gamma-aminopropyltrimethoxysilane. In this case, hydrolysis resistance can be excellent.

According to one embodiment of the present invention, the stabilizer can be included in an amount of 0.01 to 4% by weight, preferably 0.1 to 3% by weight, more preferably 0.2 to 2% by weight in the thermoplastic molding composition. In this case, when the stabilizer is included within this content range in the thermoplastic molding composition, the stabilizer can serve to prevent decomposition by heat and oxidation during processing of polyamide 66, thereby preventing deterioration in physical properties.

According to one embodiment of the present invention, the stabilizer can include one or more of an amine-based stabilizer and a phenol-based stabilizer.

The amine-based stabilizer preferably includes diphenylamine-based stabilizers, and more preferably, includes one or more selected from the group consisting of phenylnaphthylamine, 4,4'-dimethoxydiphenylamine, 4,4'-bis ($\alpha,\alpha$-dimethylbenzyl)diphenylamine, 4-(1-methyl-1-phenylethyl)-N-[4-(1-methyl-1-phenylethyl)phenyl]aniline, and 4-isopropoxy diphenylamine. In this case, a stabilizing effect can be achieved without impairing the desired effects of the present invention.

According to a more preferred embodiment of the present invention, the amine-based stabilizer can be 4-(1-methyl-1-phenylethyl)-N-[4-(1-methyl-1-phenylethyl)phenyl]aniline.

The phenol-based stabilizer preferably includes hindered phenol-based stabilizers, and more preferably, includes one or more selected from the group consisting of N,N'-hexane-1,6-diyl-bis[3-(3,5-di-t-butyl-4-hydroxyphenyl propionamide)], pentaerythritol tetrakis[3-(3,5-di-t-butyl-4-hydroxyphenyl)propionate], N,N'-hexamethylene-bis(3,5-di-t-butyl-4-hydroxyhydrocinnamide), triethyleneglycol-bis[3-(3-t-butyl-5-methyl-4-hydroxyphenyl)propionate], 3,5-di-t-butyl-4-hydroxybenzilphosphonate-diethylester, 1,3,5-trimethyl-2,4,6-tris(3,5-di-t-butyl-4-hydroxybenzil) benzene, and 1,3,5-tris(4-t-butyl-3-hydroxy-2,6-dimethylbenzyl)isocyanurate. In this case, a stabilizing effect can be achieved without impairing the desired effects of the present invention.

According to a more preferred embodiment of the present invention, the phenol-based stabilizer can be 1,6-hexanediyl bis[3,5-bis(1,1-dimethylethyl)-4-hydroxyphenylpropaneamide].

According to one embodiment of the present invention, the amine-based stabilizer and the phenol-based stabilizer can be included in a weight ratio of 2:1 to 1:2, preferably 2:1 to 1:1, more preferably 1.5:1 to 1:1, still preferably 1.5:1 to 1.1:1.

According to one embodiment of the present invention, the thermoplastic molding composition can include an additive in an amount of 0.01 to 10% by weight.

According to one embodiment of the present invention, the additive can include one or more of a pigment, a dye, a lubricant, a coupling agent, and a UV stabilizer. In addition to the above-listed materials, when necessary, additives widely used in the art can be used as the additive without limitation.

According to one embodiment of the present invention, when tensile strength is measured at a crosshead speed of 5 mm/min using a tension tester according to ISO 527, the thermoplastic molding composition can have a tensile strength of 190 MPa or more, preferably 193 MPa or more, more preferably 194 MPa or more, still more preferably 200 MPa or more, as a specific example, 190 to 250 MPa, as a preferred example, 193 to 250 MPa, as a more preferred example, 194 to 250 MPa, as a still more preferred example, 200 to 250 MPa. Within this range, moldability, mechanical properties, and chemical resistance can be excellent.

According to one embodiment of the present invention, when elongation is measured by rupturing a specimen at a crosshead speed of 5 mm/min using a tension tester according to ISO 527, the thermoplastic molding composition can have an elongation of 3.0% or more, preferably 3.2% or more, more preferably 3.4% or more, still more preferably 3.5% or more. As a specific example, the thermoplastic molding composition can have an elongation of 3.0 to 4.0%, preferably 3.2 to 4.0%, more preferably 3.4 to 4.0%, still more preferably 3.5 to 4.0%. Within this range, moldability, mechanical properties, and chemical resistance can be excellent.

According to one embodiment of the present invention, when unnotched flat and unnotched edge Charpy impact strength are measured according to ISO 179, the thermoplastic molding composition can have an impact strength of 70 kJ/m² or more, preferably 73 kJ/m² or more, more preferably 75 kJ/m² or more, still more preferably 76 kJ/m² or more. As a specific example, the thermoplastic molding composition can have an impact strength of 70 to 100 kJ/m², preferably 73 to 100 kJ/m², more preferably 75 to 100 kJ/m², still more preferably 76 to 100 kJ/m². Within this range, moldability, mechanical properties, and chemical resistance can be excellent.

According to one embodiment of the present invention, when a solution containing 50% by weight of a glycol and 50% by weight of water and a specimen are placed in an autoclave and left at 130° C. for 500 hours, the specimen is taken out of the autoclave, and then tensile strength is measured by rupturing the specimen at a crosshead speed of 5 mm/min using a tension tester according to ISO 527, the thermoplastic molding composition can have a tensile strength of 101 MPa or more, preferably 102 MPa or more, more preferably 103 MPa or more, still more preferably 104 MPa or more, as a specific example, 101 to 200 MPa, as a preferred example, 102 to 200 MPa, as a more preferred example, 103 to 200 MPa, as a still more preferred example, 104 to 200 MPa. Within this range, moldability, mechanical properties, and chemical resistance can be excellent.

According to one embodiment of the present invention, when a solution containing 50% by weight of a glycol and 50% by weight of water and a specimen are placed in an autoclave and left at 130° C. for 500 hours, the specimen is taken out of the autoclave, and then elongation is measured by rupturing the specimen at a crosshead speed of 5 mm/min using a tension tester according to ISO 527, the thermoplastic molding composition can have an elongation of 4.0% or more, preferably 4.2% or more, more preferably 4.4% or more, still more preferably 4.5% or more. As a specific example, the thermoplastic molding composition can have an elongation of 4.0 to 5.0%, preferably 4.2 to 5.0%, more preferably 4.4 to 5.0%, still more preferably 4.5 to 5.0% Within this range, moldability, mechanical properties, and chemical resistance can be excellent.

According to one embodiment of the present invention, when a solution containing 50% by weight of a glycol and 50% by weight of water and a specimen are placed in an autoclave and left at 130° C. for 500 hours, the specimen is taken out of the autoclave, and then unnotched flat and unnotched edge Charpy impact strength are measured according to ISO 179, the thermoplastic molding composition can have an impact strength of 68 kJ/m² or more, preferably 70 kJ/m² or more, more preferably 71 kJ/m² or more, still more preferably 73 kJ/m² or more, as a specific example, 68 to 90 kJ/m², preferably 70 to 90 kJ/m², more preferably 71 to 90 kJ/m², still more preferably 73 to 90 kJ/m². Within this range, moldability, mechanical properties, and chemical resistance can be excellent.

As a specific example, G48 of BASF Co. can be used as the glycol.

According to one embodiment of the present invention, when a solution containing 50% by weight of a glycol and 50% by weight of water and a specimen are placed in an autoclave and left at 130° C. for 1,000 hours, the specimen is taken out of the autoclave, and then tensile strength is measured by rupturing the specimen at a crosshead speed of 5 mm/min using a tension tester according to ISO 527, the thermoplastic molding composition can have a tensile strength of 68 MPa or more, preferably 70 MPa or more, more preferably 71 MPa or more, still more preferably 73 MPa or more, as a specific example, 68 to 120 MPa, as a preferred example, 70 to 120 MPa, as a more preferred example, 71 to 120 MPa, as a still more preferred example, 73 to 120 MPa. Within this range, moldability, mechanical properties, and chemical resistance can be excellent.

According to one embodiment of the present invention, when a solution containing 50% by weight of a glycol and 50% by weight of water and a specimen are placed in an autoclave and left at 130° C. for 1,000 hours, the specimen is taken out of the autoclave, and then elongation is measured by rupturing the specimen at a crosshead speed of 5 mm/min using a tension tester according to ISO 527, the thermoplastic molding composition can have an elongation of 1.8% or more, preferably 2.0% or more, more preferably 2.1% or more, still more preferably 2.2% or more. As a specific example, the thermoplastic molding composition can have an elongation of 1.8 to 4.0%, preferably 2.0 to 4.0%, more preferably 2.1 to 4.0%, still more preferably 2.2 to 4.0% Within this range, moldability, mechanical properties, and chemical resistance can be excellent.

According to one embodiment of the present invention, when a solution containing 50% by weight of a glycol and 50% by weight of water and a specimen are placed in an autoclave and left at 130° C. for 1,000 hours, the specimen is taken out of the autoclave, and then unnotched flat and unnotched edge Charpy impact strength are measured according to ISO 179, the thermoplastic molding composition can have an impact strength of 35 kJ/m² or more, preferably 36 kJ/m² or more, more preferably 37 kJ/m² or more, still more preferably 38 kJ/m² or more, as a specific example, 35 to 50 kJ/m², preferably 36 to 50 kJ/m², more preferably 37 to 50 kJ/m², still more preferably 38 to 50 kJ/m². Within this range, moldability, mechanical properties, and chemical resistance can be excellent.

According to one embodiment of the present invention, when a spiral test value is measured using a spiral mold (2.0 T) under conditions of an injection temperature of 300° C., a mold temperature of 80° C., and a pressure of 500 kgf, the thermoplastic molding composition can have a spiral test value of 25 cm or more, preferably 28 cm or more, more preferably 30 cm or more, still more preferably 31 cm or more, as a specific example, 25 to 35 cm, as a preferred example, 28 to 35 cm, as a more preferred example, 30 to 35 cm, as a still more preferred example, 31 to 35 cm. Within this range, moldability, mechanical properties, and chemical resistance can be excellent.

As a specific example, the spiral test can be performed using an injection molding machine (Victory 80, Engel Co.), and the spiral test value can represent the length of a molded article.

According to another embodiment of the present invention, an automobile component including a molded article manufactured using the composition according to one embodiment of the present invention is provided.

Since the automobile component according to one embodiment of the present invention includes the thermoplastic molding composition according to one embodiment of the present invention, even when the automobile component is left in a high temperature and humidity environment for a long time, the physical properties of the automobile component, such as tensile strength, elongation, and impact strength, can be maintained at a high level.

Hereinafter, the present invention will be described in detail by describing exemplary embodiments of the invention. However, the invention may be embodied in many different forms and should not be construed as being limited to the embodiments set forth herein. These embodiments are provided to more fully describe the present invention to those skilled in the art.

EXAMPLES 1 TO 5 AND COMPARATIVE EXAMPLES 1 TO 6

Components were mixed according to the compositions shown in Table 1 below, and a kneaded strand was melted and extruded at a temperature range of 260 to 285° C. using a twin-screw extruder to obtain pellets. The obtained pellets were dried at 120° C. for 3 hours and injected at an injection temperature of 300° C. and a mold temperature of 80° C. to obtain a specimen according to the ISO standard. Then, the specimen was left under conditions of a temperature of 23° C. and a relative humidity of 60% for 48 hours, and then the physical properties thereof were measured according to the ISO standard.

TABLE 1

| Classification | A-1 | A-2 | B-1 | B-2 | C | D | E |
|---|---|---|---|---|---|---|---|
| Example 1 | 68.4 | — | 31 | — | 0.2 | — | 0.4 |
| Example 2 | 66.7 | — | 31 | — | 1.0 | 0.9 | 0.4 |
| Example 3 | 68.4 | — | — | 31 | 0.2 | — | 0.4 |
| Example 4 | 39.4 | — | — | 60 | 0.2 | — | 0.4 |
| Example 5 | 84.4 | — | — | 15 | 0.2 | — | 0.4 |
| Comparative Example 1 | — | 68.4 | 31 | — | 0.2 | — | 0.4 |
| Comparative Example 2 | — | 68.4 | — | 31 | 0.2 | — | 0.4 |
| Comparative Example 3 | — | 84.4 | — | 15 | 0.2 | — | 0.4 |
| Comparative Example 4 | — | 68.1 | 31 | — | 0.5 | — | 0.4 |
| Comparative Example 5 | — | 67.6 | 31 | — | 1.0 | — | 0.4 |
| Comparative Example 6 | — | 66.7 | — | 31 | 1.0 | 0.9 | 0.4 |

A-1: Polyamide 66 (Invista Co.) containing an amine end group in a concentration of 85 megiv/kg or more
* A-2: Polyamide 66 containing an amine end group in a concentration of 80 megiv/kg or less
B-1: Glass fiber (CPIC Co.) for improving chemical resistance having a diameter of 10 to 13 μm and a chop length of 3 to 4 mm
* B-2: General-purpose glass fiber (Owens Corning Co.) having a diameter of 10 to 13 μm and a chop length of 3 to 4 mm
C: Naugard 445 as an aromatic amine-based stabilizer
* D: Irganox 1098 as a phenol-based stabilizer
E: Additives including OP-wax (Clariant Co.), K003 (containing 30% by weight of carbon black and 70% by weight of a polyamide 6 carrier) as a pigment, and K007 (nigrosin-based dye with heat stability) as a dye

* Tensile strength and elongation: Tensile strength was measured at a crosshead speed of 5 mm/min using a tension tester according to ISO 527, and elongation was measured/calculated when rupturing a tensile specimen.
* Impact strength: Unnotched flat and unnotched edge Charpy impact strength were measured according to ISO 179. In the case of measuring impact strength at low temperature, a notch was made on a specimen in a constant temperature chamber set to −30° C., the specimen was stored for 3 hours, and then impact strength was measured.
* Evaluation of chemical resistance: A solution containing glycol and water (50%:50%) was prepared using G48 glycol (BASF Co.). The prepared solution and the specimens prepared in Examples 1 to 5 and Comparative Examples 1 to 6 were placed in an autoclave and left at 130° C. for 500 hours or 1,000 hours. Then, tensile strength, elongation, and impact strength were measured as described above.

The measurement results of the physical properties are shown in Table 2 below.

TABLE 2

| Classification | Initial physical properties | | | Evaluation of chemical resistance for 500 hours | | | Evaluation of chemical resistance for 1,000 hours | | |
|---|---|---|---|---|---|---|---|---|---|
| | Tensile strength (MPa) | Elongation (%) | Impact strength (kJ/m$^2$) | Tensile strength (MPa) | Elongation (%) | Impact strength (kJ/m$^2$) | Tensile strength (MPa) | Elongation (%) | Impact strength (kJ/m$^2$) |
| Example 1 | 201 | 3.6 | 77 | 105 | 4.3 | 74 | 74 | 2.1 | 38 |
| Example 2 | 194 | 3.4 | 73 | 103 | 4.5 | 71 | 73 | 2.3 | 40 |
| Example 3 | 191 | 3.4 | 74 | 95 | 3.7 | 61 | 54 | 1.0 | 25 |
| Example 4 | 265 | 2.3 | 110 | 140 | 2.0 | 92 | 125 | 0.7 | 35 |
| Example 5 | 120 | 4.5 | 40 | 75 | 5.2 | 29 | 40 | 1.3 | 15 |
| Comparative Example 1 | 191 | 3.4 | 74 | 95 | 3.7 | 61 | 54 | 1.0 | 25 |
| Comparative Example 2 | 187 | 3.1 | 62 | 100 | 4.2 | 60 | 50 | 0.8 | 20 |
| Comparative Example 3 | 120 | 4.5 | 40 | 75 | 5.2 | 29 | 40 | 1.3 | 15 |
| Comparative Example 4 | 199 | 3.4 | 78 | 92 | 4.2 | 62 | 54 | 1.0 | 26 |
| Comparative Example 5 | 199 | 3.3 | 74 | 97 | 4.7 | 61 | 61 | 1.1 | 28 |
| Comparative Example 6 | 182 | 3.3 | 74 | 97 | 3.6 | 63 | 62 | 1.2 | 30 |

* Spiral test: For the compositions prepared in Examples 1 to 3 and Comparative Examples 1 to 6, the lengths of molded articles were measured under conditions of an injection temperature of 300° C., a mold temperature of 80° C., and a pressure of 500 kgf using an injection molding machine (Victory 80, Engel Co.) and using a spiral mold (2.0 T). The results are shown in Table 3 below.

TABLE 3

| Classification | Spiral test (cm) |
| --- | --- |
| Example 1 | 30.0 |
| Example 2 | 31.5 |
| Example 3 | 29.5 |
| Comparative Example 1 | 29.5 |
| Comparative Example 2 | 31.0 |
| Comparative Example 3 | 35.0 |
| Comparative Example 4 | 30.0 |
| Comparative Example 5 | 31.5 |
| Comparative Example 6 | 32.0 |

Referring to Tables 2 and 3, it can be confirmed that, in the case of Examples 1 to 5, degree of decrease in tensile strength, elongation, and impact strength is less than that of Comparative Examples 1 to 6, even after being left for 500 hours or 1,000 hours in a high temperature and humidity environment when evaluating chemical resistance. In addition, as a result of the spiral test, it can be confirmed that the length of the injected specimen is long, indicating that moldability is also excellent.

In particular, regarding tensile strength and elongation that are sensitive to chemical substances and rapidly decrease when evaluating chemical resistance, in the case of Examples 1 and 2, degree of decrease in tensile strength and elongation is less than Examples 3 to 5 even after being left in a high temperature and humidity environment for 500 hours or 1,000 hours in the presence of a chemical substance. Furthermore, in this respect, Examples 1 and 2 are far superior to Comparative Examples 1 to 6.

However, in the case of Comparative Examples 1 to 6 including polyamide 66 containing an amine end group in a concentration of 80 meqiv/kg or less, the physical properties thereof are significantly deteriorated when left in a high temperature and humidity environment for a long time, or the length of the injected specimen is very short, indicating that moldability is very poor.

The invention claimed is:

1. A thermoplastic molding composition, comprising:
polyamide 66;
glass fiber; and
a stabilizer,
wherein the polyamide 66 contains an amine end group of 85 meqiv/kg or more,
wherein the polyamide 66 is comprised in the thermoplastic molding composition in an amount of 65 to 75% by weight,
wherein a surface of the glass fiber is treated with a hydrolysis-resistant coating, and
wherein the stabilizer comprises an amine-based stabilizer selected from the group consisting of phenylnaphthylamine, 4,4'-dimethoxydiphenylamine, 4,4'-bis (α,α-dimethylbenzyl) diphenylamine, 4-(1-methyl-1-phenylethyl)-N-[4-(1-methyl-1-phenylethyl) phenyl] aniline, and 4-isopropoxy diphenylamine.

2. The thermoplastic molding composition according to claim 1, wherein, when a solution containing 50% by weight of a glycol and 50% by weight of water and a specimen of the thermoplastic molding composition are placed in an autoclave and then left at 130° C. for 1,000 hours and then the specimen is taken out of the autoclave and then unnotched flat and unnotched edge Charpy impact strength are measured according to ISO 179, the thermoplastic molding composition has an impact strength of 35 KJ/m$^2$ or more.

3. The thermoplastic molding composition according to claim 1, wherein, when a solution containing 50% by weight of a glycol and 50% by weight of water and a specimen of the thermoplastic molding composition are placed in an autoclave and then left at 130° C. for 1,000 hours and then the specimen is taken out of the autoclave and then elongation is measured by rupturing the specimen at a crosshead speed of 5 mm/min using a tension tester according to ISO 527, the thermoplastic molding composition has an elongation of 1.8% or more.

4. The thermoplastic molding composition according to claim 1, wherein the polyamide 66 is comprised in the thermoplastic molding composition in an amount of 65 to 70% by weight.

5. The thermoplastic molding composition according to claim 1, wherein the polyamide 66 has a relative viscosity of 2.0 to 3.2.

6. The thermoplastic molding composition according to claim 1, wherein the glass fiber is comprised in the thermoplastic molding composition in an amount of 20 to 50% by weight.

7. The thermoplastic molding composition according to claim 1, wherein the stabilizer is comprised in the thermoplastic molding composition in an amount of 0.01 to 4% by weight.

8. The thermoplastic molding composition according to claim 1, wherein the stabilizer further comprises a phenol-based stabilizer.

9. The thermoplastic molding composition according to claim 8, wherein the phenol-based stabilizer comprises a hindered phenol-based stabilizer.

10. The thermoplastic molding composition according to claim 8, wherein the amine-based stabilizer and the phenol-based stabilizer are comprised in the thermoplastic molding composition at a weight ratio of 2:1 to 1:2.

11. The thermoplastic molding composition according to claim 1, further comprising an additive in an amount of 0.01 to 10% by weight.

12. The thermoplastic molding composition according to claim 11, wherein the additive comprises one or more selected from the group consisting of a pigment, a dye, a lubricant, a coupling agent, and a UV stabilizer.

13. An automobile component, comprising a molded article manufactured using the thermoplastic molding composition according to claim 1.

14. The thermoplastic molding composition according to claim 8, wherein the phenol-based stabilizer comprises one or more compounds selected from the group consisting of 1,6-hexanediylbis [3,5-bis (1,1-dimethylethyl)-4-hydroxyphenylpropaneamide], N,N'-hexane-1,6-diyl-bis [3-(3,5-di-t-butyl-4-hydroxyphenyl propionamide)], pentaerythritol tetrakis [3-(3,5-di-t-butyl-4-hydroxyphenyl) propionate], N,N'-hexamethylene-bis (3,5-di-t-butyl-4-hydroxyhydrocinnamide), triethyleneglycol-bis [3-(3-t-butyl-5-methyl-4-hydroxyphenyl) propionate], 3,5-di-t-butyl-4-hydroxybenzilphosphonate-diethylester, 1,3,5-trimethyl-2,4,6-tris (3,5-di-t-butyl-4-hydroxybenzyl) benzene, and 1,3,5-tris (4-t-butyl-3-hydroxy-2,6-dimethylbenzyl) isocyanurate.

* * * * *